(12) United States Patent  
Sugawara et al.

(10) Patent No.: US 9,415,748 B2  
(45) Date of Patent: Aug. 16, 2016

(54) SEAT BELT WEARING DETECTION DEVICE

(71) Applicant: ALPS ELECTRIC CO., LTD., Tokyo (JP)

(72) Inventors: Takehito Sugawara, Miyagi-ken (JP); Hideki Masudaya, Tokyo (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 44 days.

(21) Appl. No.: 14/509,879

(22) Filed: Oct. 8, 2014

(65) Prior Publication Data

US 2015/0145666 A1     May 28, 2015

(30) Foreign Application Priority Data

Nov. 28, 2013    (JP) ................................. 2013-246230

(51) Int. Cl.
*B60Q 1/00*      (2006.01)
*B60R 22/48*      (2006.01)

(52) U.S. Cl.
CPC ......... *B60R 22/48* (2013.01); *B60R 2022/4816* (2013.01)

(58) Field of Classification Search
CPC ........................ B60R 22/48; B60R 2022/4816
USPC ...................................................... 340/457.1
See application file for complete search history.

(56) References Cited

U.S. PATENT DOCUMENTS

| | | | | |
|---|---|---|---|---|
| 8,427,294 B2 * | 4/2013 | Cheung | .............. | A44B 11/2569 340/457.1 |
| 2005/0061568 A1 * | 3/2005 | Schondorf | .............. | B60R 22/48 280/801.1 |
| 2007/0205884 A1 * | 9/2007 | Federspiel | .............. | B60N 2/002 340/457.1 |
| 2008/0084290 A1 * | 4/2008 | Hawkins | ............. | B60R 21/0152 340/457.1 |
| 2008/0238647 A1 * | 10/2008 | Abe | ........................ | B60R 22/48 340/457.1 |
| 2010/0283593 A1 * | 11/2010 | Miller | ................. | B60C 23/0408 340/447 |
| 2014/0052342 A1 * | 2/2014 | Seibert | ................... | B60N 2/002 340/457.1 |

FOREIGN PATENT DOCUMENTS

JP      2008-238947      10/2008

* cited by examiner

*Primary Examiner* — Eric M Blount
(74) *Attorney, Agent, or Firm* — Beyer Law Group LLP (57) ABSTRACT

A seat belt wearing detection device includes: a tongue unit supported by a seat belt; a buckle unit into which the tongue unit is inserted and held; a wearing detection unit that detects an insertion and holding state; a seat belt side communication unit that transmits a detection result; a control unit that determines a wearing state based on the detection result and controls the seat belt side communication unit; power supply means for supplying electric power to the seat belt side communication unit; and a vehicle side device that performs radio communication with the seat belt side communication unit to receive the detection result. The power supply means includes a power supply section, a power storage section, and a charging section. The power supply section charges the power storage section by supplying electric power to the charging section when the seat belt is in a housed state.

8 Claims, 10 Drawing Sheets

SEAT BELT WEARING DETECTION DEVICE

CLAIM OF PRIORITY

This application claims benefit of Japanese Patent Application No. 2013-246230 filed on Nov. 28, 2013, which is hereby incorporated by reference.

BACKGROUND OF THE INVENTION

1. Field of the Invention

The present invention relates to a seat belt wearing detection device that detects the wearing of a seat belt provided in a vehicle, and in particular, to a seat belt wearing detection device that determines a wearing state of the seat belt based on a signal transmitted by radio communication.

2. Description of the Related Art

A technique for detecting the wearing state of the seat belt provided in a vehicle and displaying the detection result is known. The wearing state is detected by a buckle switch disposed in a buckle device, and a signal indicating the detection result is transmitted by cable from the seat belt to a control unit of the vehicle so that display control or the like is performed.

In a vehicle in which some seats are detachable, a buckle device is provided in a detachable seat. In this case, it has been difficult to connect a signal line for connection with the control unit of the vehicle or to connect a wiring line for supplying electric power. For this reason, a technique for transmitting a signal by radio communication from the seat belt side when seat belt wearing is detected has been proposed.

Figure 10:
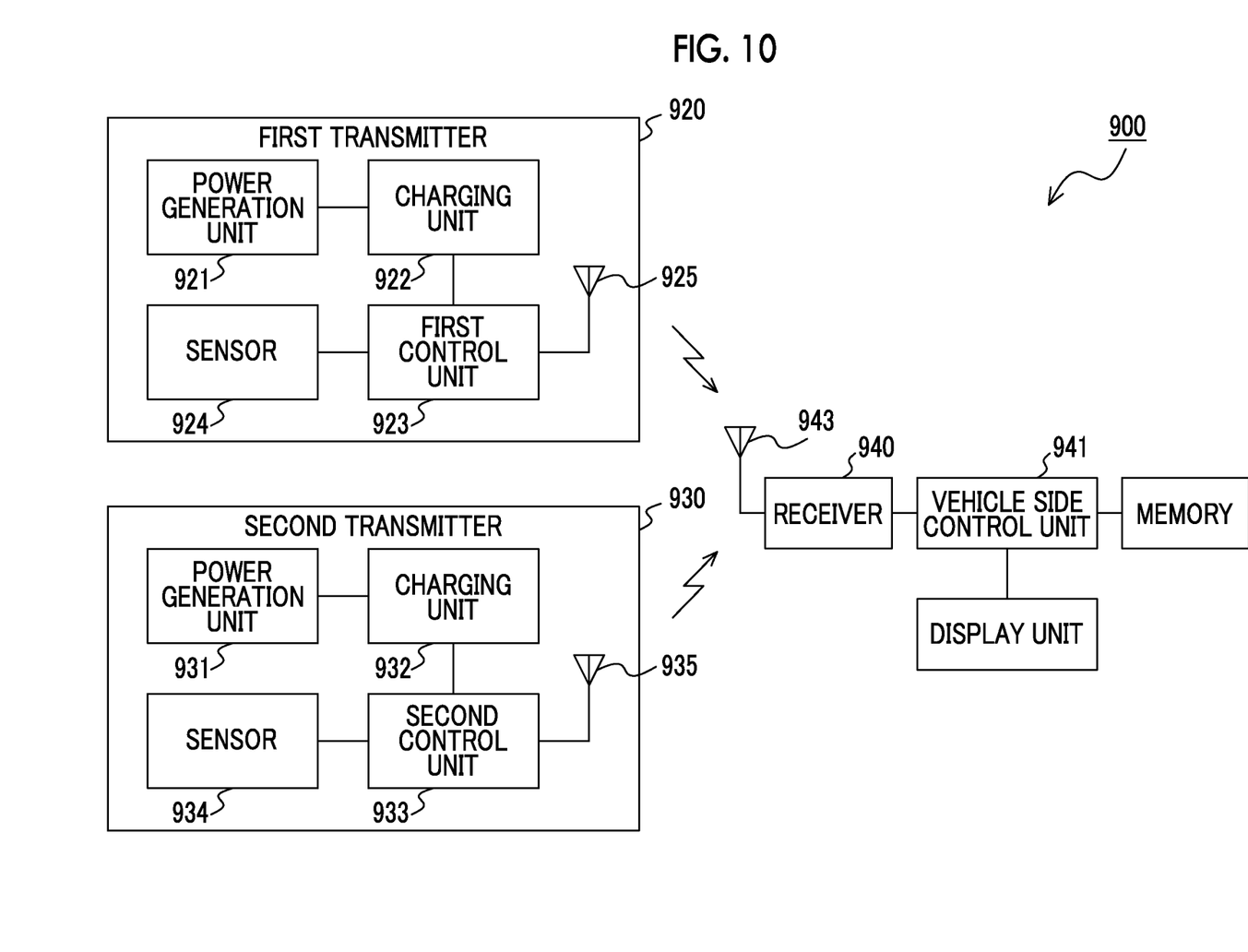
FIG. 10 is a block diagram explaining the configuration (seat belt wearing detection device) for transmitting and receiving the wearing state of a seat belt provided in a vehicle as a radio signal in the related art.

In Japanese Unexamined Patent Application Publication No. 2008-238947 (known example 1), as shown in FIG. 10, a configuration (seat belt wearing detection device) 900 for transmitting and receiving the wearing state of the seat belt provided in a vehicle as a radio signal is shown. A first transmitter 920 shown in FIG. 10 is provided on the buckle unit side of the seat belt, a second transmitter 930 shown in FIG. 10 is provided on the take-up unit side of the seat belt, and a receiver 940 and other devices shown in FIG. 10 are provided on the vehicle side.

The first transmitter 920 provided in the buckle unit of the seat belt is configured to include a power generation unit 921, a charging unit 922, a first control unit 923, a sensor 924, and an antenna 925. In addition, the second transmitter 930 provided on the take-up unit side is configured to include a power generation unit 931, a charging unit 932, a second control unit 933, a sensor 934, and an antenna 935.

By a preliminary operation of pulling out the belt prior to wearing and a wearing operation of inserting a tongue unit provided at the distal end of the belt into the buckle unit, electric power is generated in the power generation units 921 and 931. Using the electric power generated by the power generation units 921 and 931, signals are transmitted by radio communication from the first and second transmitters 920 and 930 to the vehicle side. The signal transmitted from the first transmitter 920 or the second transmitter 930 is received by the receiver 940 including an antenna 943 provided on the vehicle side, and the wearing state of the seat belt is determined by a vehicle side control unit 941.

In the known example described above, however, since electric power generated by the preliminary operation of pulling out the belt prior to wearing and the wearing operation of inserting the tongue unit into the buckle unit is used, the amount of electric power that can be generated is small. Therefore, it is not possible to increase the transmission time or the number of times of transmission within the generated electric power. Thus, there has been a problem in that it is difficult to ensure the reliability by transmitting a signal continuously (for example, by retransmitting a signal) when a transmitted signal cannot be correctly received due to the influence of electromagnetic noise or the like.

SUMMARY OF THE INVENTION

The present invention provides a seat belt wearing detection device capable of ensuring reliability by transmitting a wearing detection signal continuously.

According to an aspect of the present invention, there is provided a seat belt wearing detection device including: a tongue unit supported by a seat belt having a housed state and a pulled-out state; a buckle unit which is provided in a seat and into which the tongue unit is inserted and held to fasten the seat belt; a wearing detection unit that detects an insertion and holding state between the tongue unit and the buckle unit; a seat belt side communication unit that transmits a detection result of the wearing detection unit using a radio signal; a control unit that is connected to the seat belt side communication unit and the wearing detection unit and that determines a wearing state of the seat belt based on the detection result and controls the seat belt side communication unit; power supply means for supplying electric power to the seat belt side communication unit; and a vehicle side device that performs radio communication with the seat belt side communication unit to receive the detection result. The power supply means includes a power supply section that supplies electric power, a power storage section that is chargeable and dischargeable, and a charging section that charges the power storage section, and the power supply section charges the power storage section by supplying electric power to the charging section when the seat belt is in a housed state.

In this case, since the power storage section is charged by the charging section when the seat belt is in a housed state, the power storage section is always charged when a rider is not using the seat belt. Therefore, it is possible to supply electric power required for communication. For this reason, when a transmitted signal cannot be received correctly due to the influence of electromagnetic noise or the like, it is possible to perform retransmission or to transmit a state periodically. Therefore, it is possible to provide a seat belt wearing detection device capable of ensuring the reliability by transmitting the wearing detection signal continuously.

In addition, the seat belt wearing detection device according to the aspect of the present invention may further include a belt support unit that supports attachment and detachment of the seat belt. The power supply section may be disposed in the belt support unit, and the charging section and the power storage section may be provided in the tongue unit. The belt support unit and the tongue unit may be disposed at positions facing each other when the seat belt is in the housed state.

In this case, since the power supply section is disposed in the belt support unit, the supply of electric power to the power supply section is made possible by a simple structure connected to the fixed wiring line of the vehicle. In addition, since the belt support unit and the tongue unit are disposed at positions facing each other when the seat belt is in a housed state, the power supply section and the charging section can be easily connected to each other. Therefore, it is possible to easily charge the power storage section in the housed state.

In the seat belt wearing detection device according to the aspect of the present invention, the seat belt side communication unit may be provided in the tongue unit.

In this case, since the seat belt side communication unit is provided in the tongue unit, the power storage section and the seat belt side communication section can be easily connected to each other in the tongue unit. Therefore, the supply of electric power to the seat belt side communication section can be easily performed.

In the seat belt wearing detection device according to the aspect of the present invention, the vehicle side device may include housing position detection means, and may perform control to drive the power supply section when it is detected that the tongue unit is in the housed state based on a detection result of the housing position detection means.

In this case, since the power supply section is driven only when it is detected that the tongue unit is in the housed state, the power storage section can be efficiently charged without wasting electric power.

In the seat belt wearing detection device according to the aspect of the present invention, a primary coil may be provided in the power supply section, and a secondary coil may be provided in the charging section. Electromotive force may be generated in the secondary coil by supplying AC current to the primary coil.

In this case, since the primary coil and the secondary coil are inductively coupled, electric power can be supplied from the power supply section to the charging section. Therefore, since the power supply section provided in the belt support unit and the charging section provided in the tongue unit are close to each other when the seat belt is in a housed state, it is possible to reliably perform charging.

In addition, in the seat belt wearing detection device according to the aspect of the present invention, the primary coil of the power supply section and the secondary coil of the charging section may face each other when the seat belt is in the housed state.

In this case, since the power supply section including the primary coil and the charging section including the secondary coil are disposed at positions facing each other when the seat belt is in the housed state, electric power can be reliably supplied from the power supply section to the charging section without the rider being aware of it.

In addition, in the seat belt wearing detection device according to the aspect of the present invention, the vehicle side device may be connected to a vehicle battery, and the vehicle side device may perform control preventing operation of the power supply section when a remaining capacity of the vehicle battery is less than a predetermined value.

In this case, consumption of the vehicle battery power can be prevented by supplying electric power according to the state of the vehicle battery.

In addition, in the seat belt wearing detection device according to the aspect of the present invention, the vehicle side device may include a notification unit, acquire a value of a remaining capacity of the power storage section from the seat belt side communication unit by radio communication, and drive the notification unit when the acquired value of the remaining capacity of the power storage section is less than a predetermined value.

In this case, since the notification unit is driven when the value of the remaining capacity of the power storage section is small, it is possible to notify the user of a situation where the power storage section is not charged for a long period of time or the power storage section has deteriorated and accordingly the capacity has been reduced. Therefore, it is possible to appropriately maintain the charge state of the power storage section or to perform proper maintenance, such as replacing the power storage section.

As described above, in the seat belt wearing detection device according to the aspect of the present invention, it is possible to provide a seat belt wearing detection device capable of ensuring reliability by transmitting the wearing detection signal continuously.

DESCRIPTION OF THE PREFERRED EMBODIMENTS

First Embodiment

Hereinafter, a seat belt wearing detection device 100 in a first embodiment will be described.

Figure 1:
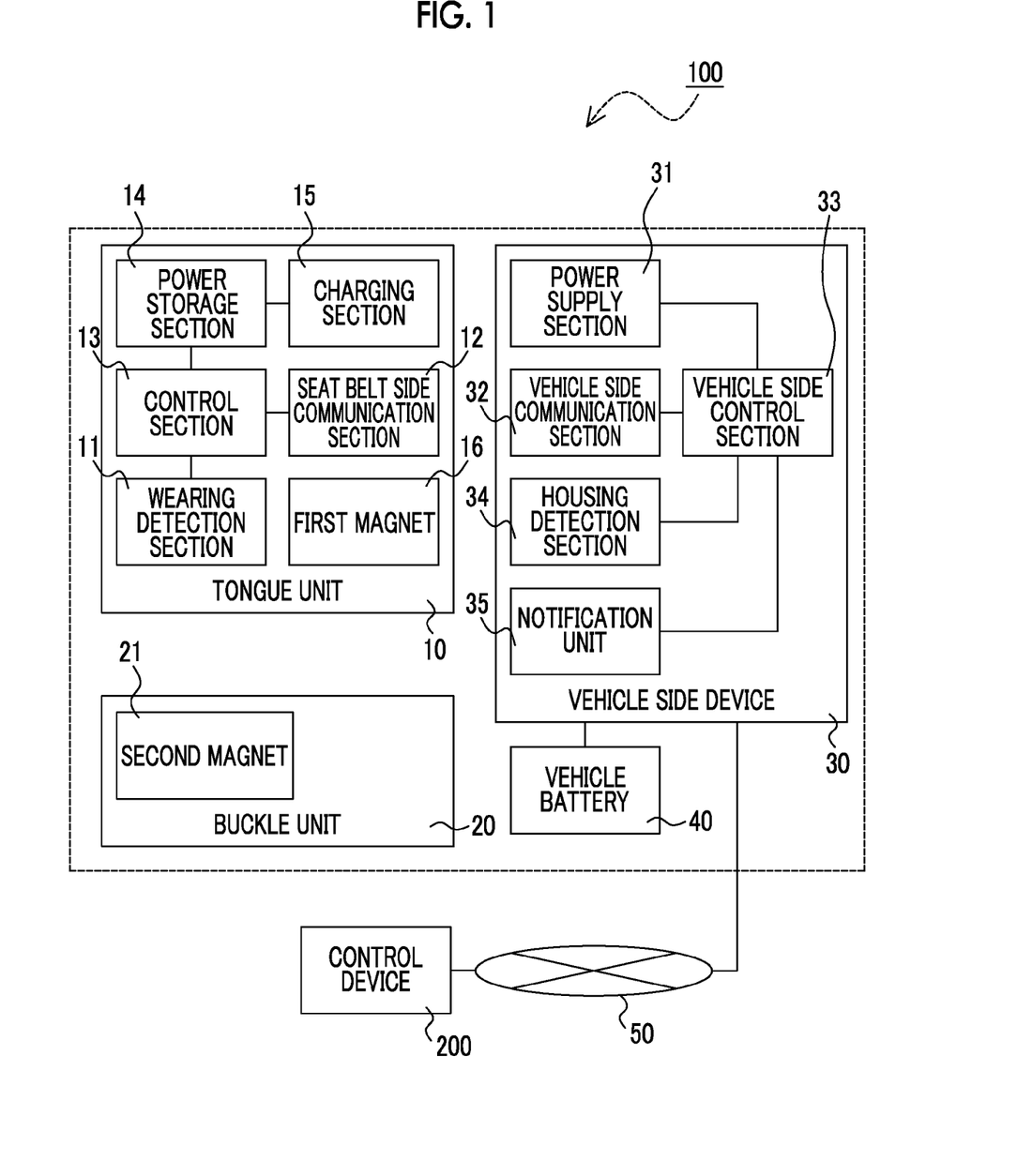
FIG. 1 is a block diagram showing the configuration of a seat belt wearing detection device according to an embodiment of the present invention.
Figure 2:
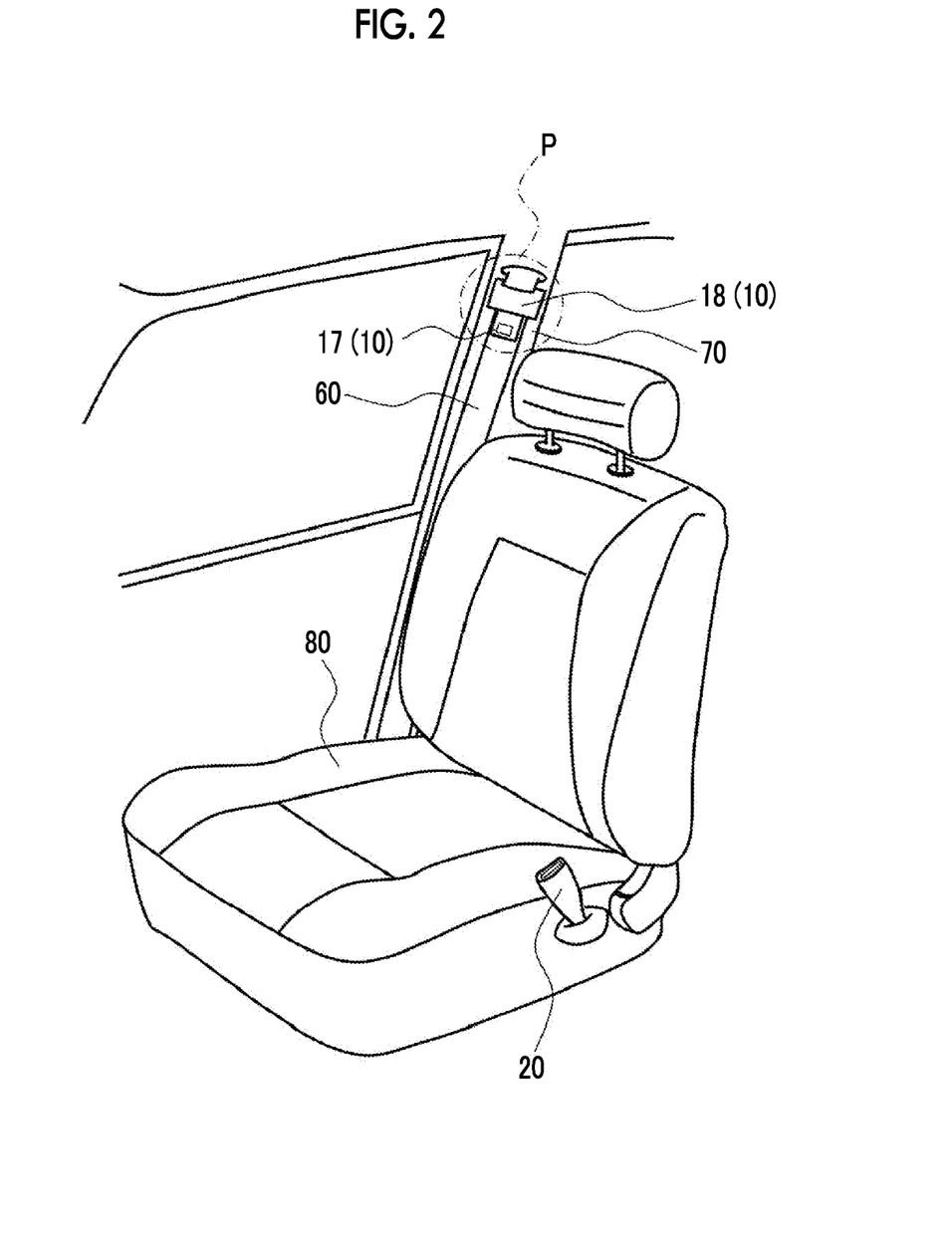
FIG. 2 is a diagram explaining the appearance and arrangement state of a tongue unit and a buckle unit.
Figure 3:
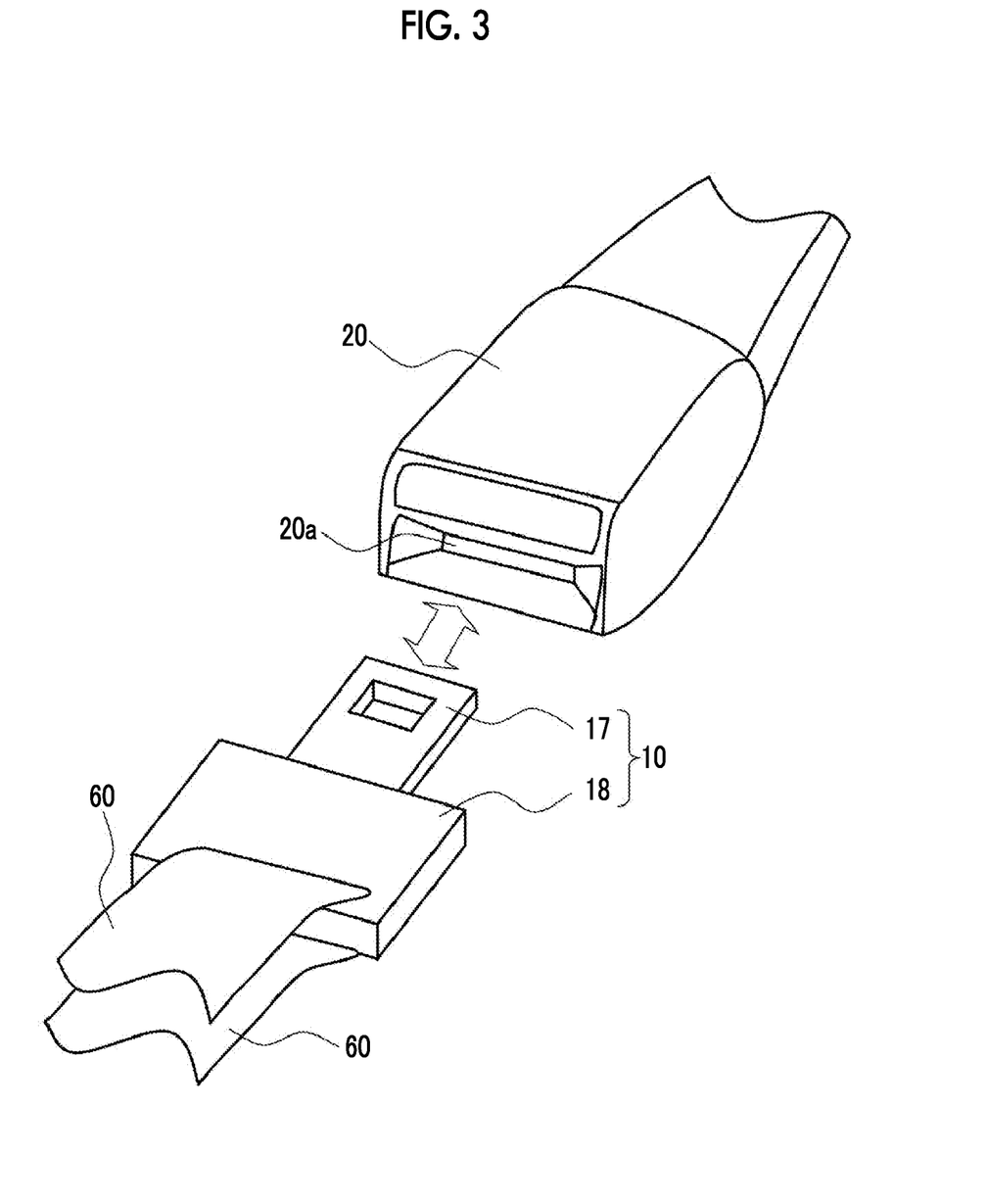
FIG. 3 is a diagram showing the tongue unit and the buckle unit before wearing a seat belt.
Figure 4A:
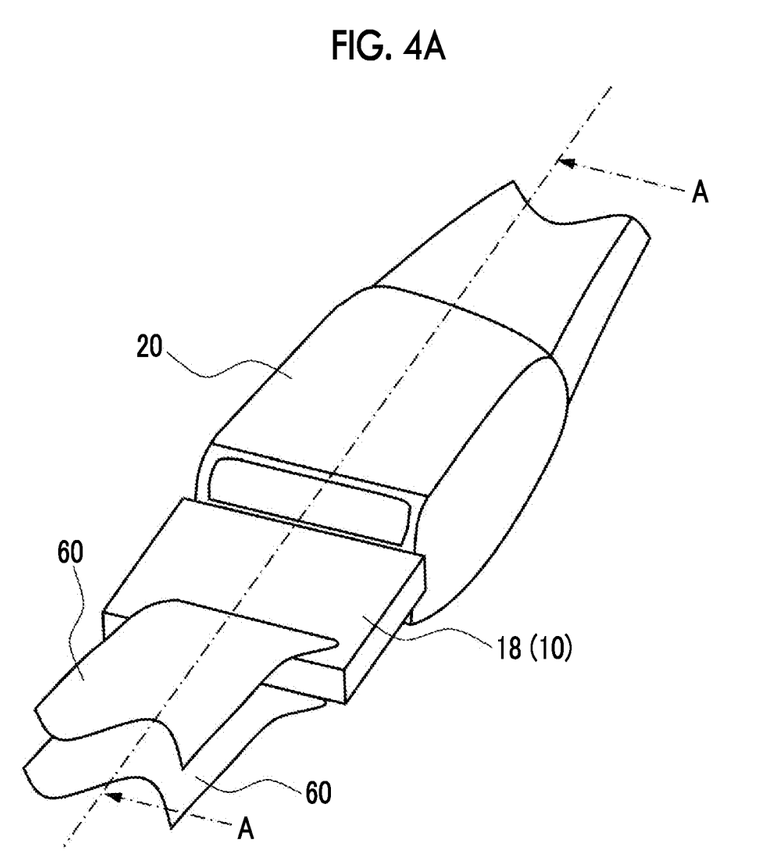
FIGS. 4A and 4B are diagrams showing the tongue unit and the buckle unit after wearing the seat belt.
Figure 4B:
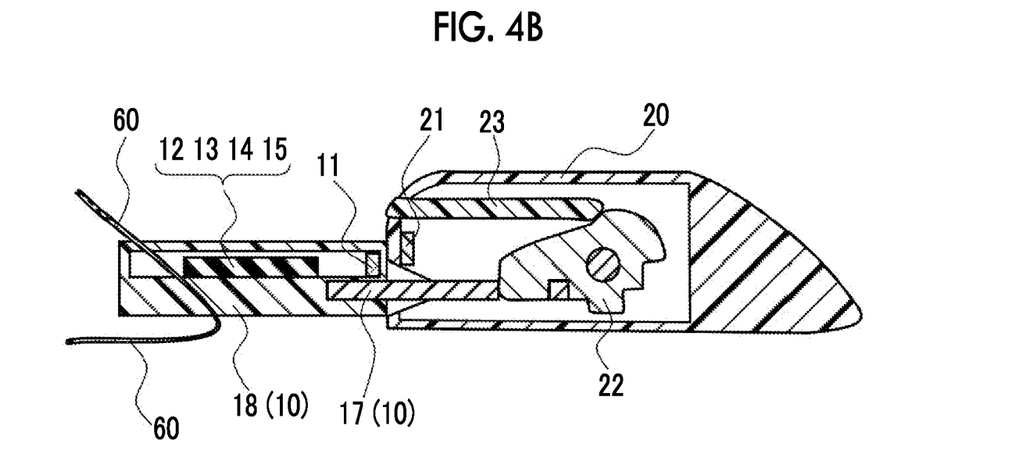
Figure 5:
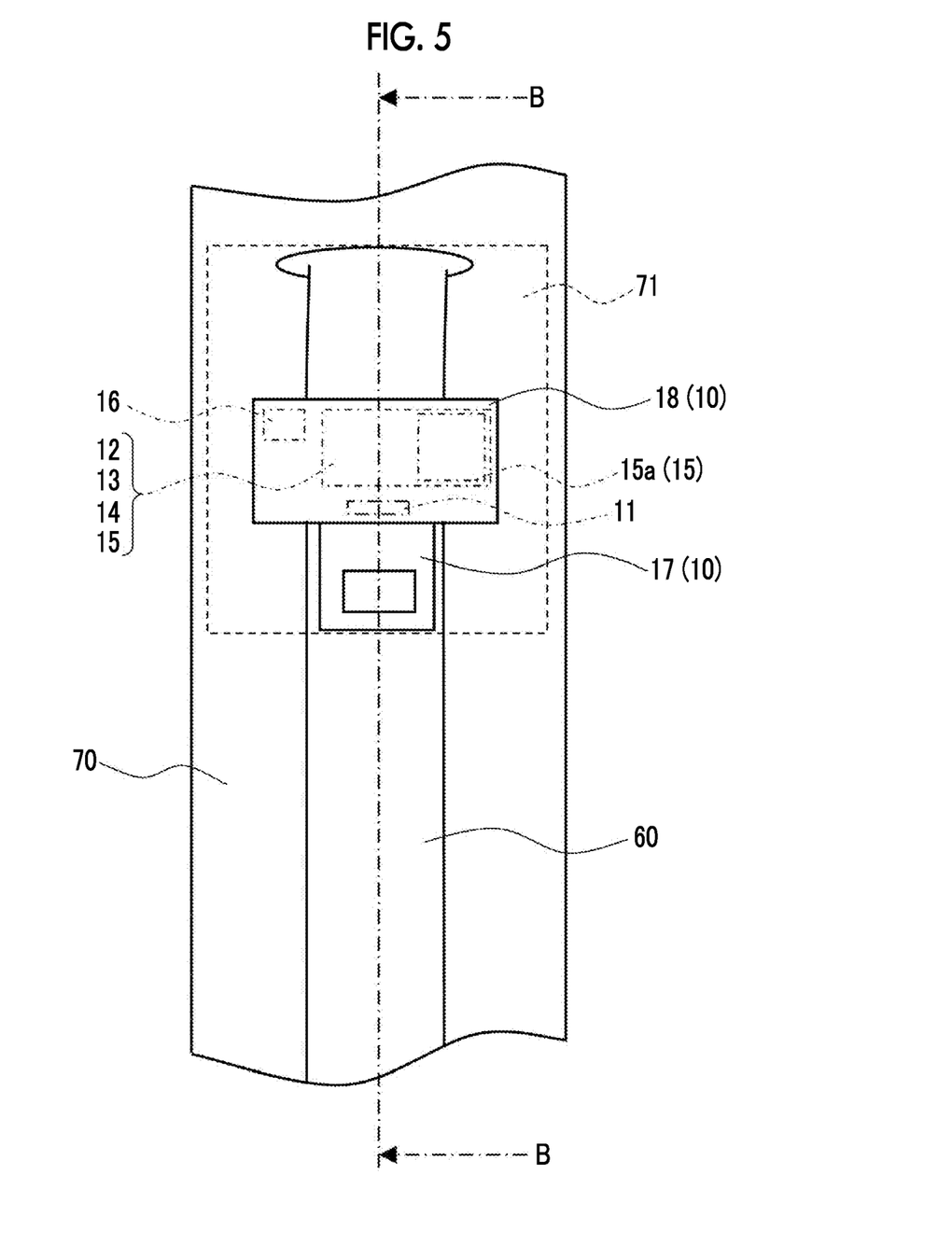
FIG. 5 is a partially enlarged view of a P portion shown in FIG. 2.
Figure 6:
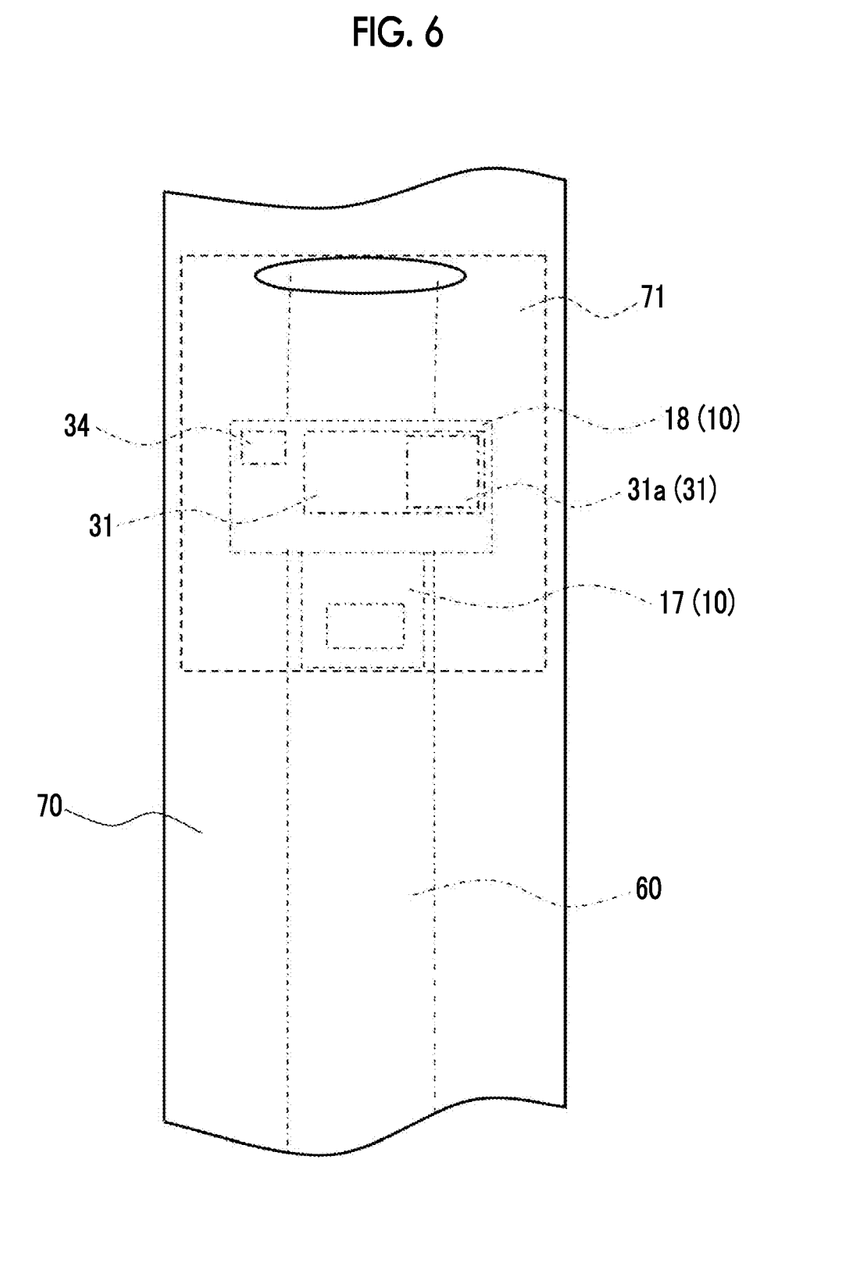
FIG. 6 is a diagram explaining a belt support unit shown in FIG. 5.
Figure 7:
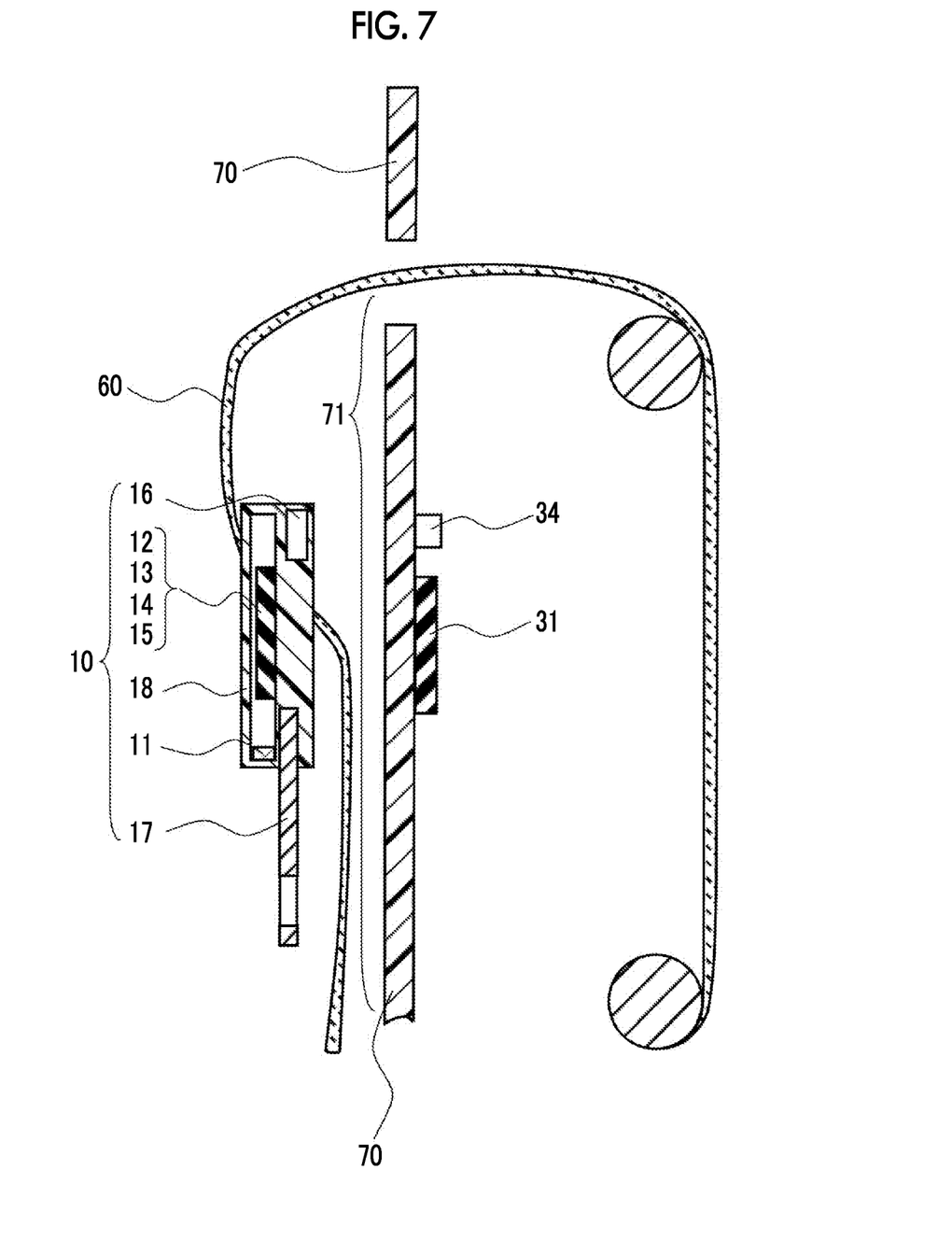
FIG. 7 is a cross-sectional view taken along the line B-B of FIG. 5.

First, the configuration of the seat belt wearing detection device 100 in the present embodiment will be described with reference to FIGS. 1 to 7. FIG. 1 is a block diagram showing the configuration of the seat belt wearing detection device 100. FIG. 2 is a diagram explaining the appearance and arrangement state of a tongue unit 10 and a buckle unit 20. FIG. 3 is a diagram showing the tongue unit 10 and the buckle unit 20 before wearing a seat belt 60. FIGS. 4A and 4B are diagrams showing the tongue unit 10 and the buckle unit 20 after wearing the seat belt 60. FIG. 4A is a diagram showing the appearance when the tongue unit 10 is inserted and held in the buckle unit 20, and FIG. 4B is a cross-sectional view taken along the line A-A of FIG. 4A. FIG. 5 is a partially enlarged view of a center pillar 70 shown in FIG. 2, and is a diagram explaining the positional relationship between a belt support unit 71 and the tongue unit 10. FIG. 6 is a diagram explaining the arrangement positions of a power supply section 31 and a housing detection section 34 provided in the belt support unit 71. FIG. 7 is a diagram explaining the positional relationship between the belt support unit 71 and the tongue unit 10, and is a cross-sectional view taken along the line B-B of FIG. 5.

As shown in FIG. 1, the seat belt wearing detection device 100 includes the tongue unit 10, the buckle unit 20, a vehicle side device 30, and a vehicle battery 40. In addition, the vehicle side device 30 is connected to an in-vehicle LAN 50, and is connected to at least one control device 200 in a vehicle through the in-vehicle LAN 50 to perform communication therebetween, so that it is possible to acquire information regarding the operating state of the vehicle or transmit the information from the vehicle side device 30.

As shown in FIG. 1, the tongue unit 10 includes a wearing detection section 11, a seat belt side communication section 12, a control section 13, a power storage section 14, a charging section 15, and a first magnet 16. In addition, as shown in FIGS. 2 and 3, the tongue unit 10 includes a plate-shaped tongue plate 17 and a housing 18 having an approximately rectangular parallelepiped shape, and is supported by the seat belt 60 in a state where the support position of the housing 18 with respect to the seat belt 60 can move. The wearing detection section 11, the seat belt side communication section 12, the control section 13, the power storage section 14, the charging section 15, and the first magnet 16 provided in the tongue unit 10 are housed inside the housing 18, and the tongue plate 17 is fixed to the housing 18.

The buckle unit 20 is provided in a seat 80 as shown in FIG. 2, and includes a second magnet 21 as shown in FIG. 1. In addition, as shown in FIG. 3, an insertion hole 20a into which the tongue plate 17 of the tongue unit 10 is inserted is provided in the buckle unit 20. When wearing the seat belt 60, the seat belt 60 is fastened by inserting and holding the tongue unit 10 into the buckle unit 20 as shown in FIG. 4A in a state where the tongue plate 17 of the tongue unit 10 is directed to the insertion hole 20a of the buckle unit 20 as shown in FIG. 3. In addition, as shown in FIG. 4B, a supporting mechanism 22 for supporting the tongue unit 10, a release mechanism 23 for releasing the support of the tongue unit 10, and the like are provided in the buckle unit 20.

As shown in FIG. 1, the vehicle side device 30 includes the power supply section 31, a vehicle side communication section 32, a vehicle side control section 33, the housing detection section 34, and a notification unit 35. In addition, the vehicle side device 30 is connected to the vehicle battery 40.

The vehicle battery 40 is connected to the vehicle side device 30, and supplies electric power to the vehicle side device 30.

The seat belt 60 is housed in a housing unit provided inside the center pillar 70 of the vehicle when the seat belt 60 is not fastened, and is pulled out from the housing unit when the seat belt 60 is fastened. FIG. 2 shows the housed state of the seat belt 60.

As shown in FIG. 5, the center pillar 70 includes the belt support unit 71 that supports the seat belt 60 so as to freely move into and out of the housing unit. The belt support unit 71 is disposed at a position facing the tongue unit 10 when the seat belt 60 is in a housed state.

The wearing detection section 11 provided in the tongue unit 10 is formed by using a magnetic detection element, such as a magneto-resistive element or a Hall element, and detects the state of a magnetic field applied to the wearing detection section 11 and outputs the detection result. Therefore, when the tongue unit 10 is inserted and held in the buckle unit 20, it is possible to detect the insertion and holding state between the tongue unit 10 and the buckle unit 20 since the second magnet 21 provided in the buckle unit 20 becomes closer to the wearing detection section 11 provided in the tongue unit 10 as shown in FIG. 4B. In addition, the output of the wearing detection section 11 is connected to the control section 13.

The seat belt side communication section 12 provided in the tongue unit 10 has a communication function for performing communication with the vehicle side device 30 using a radio signal. In addition, the seat belt side communication section 12 is connected to the control section 13, so that the communication operation is controlled by the control section 13. The seat belt side communication section 12 receives a radio signal transmitted from the vehicle side device 30 and outputs the reception result to the control section 13, and transmits a transmission signal to the vehicle side device 30 based on a signal output from the control section 13.

The control section 13 provided in the tongue unit 10 is connected to the wearing detection section 11, the seat belt side communication section 12, and the power storage section 14. The control section 13 determines the wearing state of the seat belt 60 based on a detection signal output as the detection result of the wearing detection section 11, and detects the output voltage of the power storage section 14. In addition, the control section 13 controls the seat belt side communication section 12 to transmit the wearing state of the seat belt 60 determined based on the detection result, a calculation result of the value of the output voltage acquired from the power storage section 14, or the like to the vehicle side device 30. In addition, the control section 13 has a timer function or a memory (not shown), so that the control interval can be managed by the timer function or the acquired calculation result of the value of the output voltage of the power storage section 14 or the value of the detection signal can be stored.

As the power storage section 14 provided in the tongue unit 10, for example, a capacitor or a secondary battery, such as a lithium-ion battery that can be charged and discharged, is used. Electric power stored in the power storage section 14 by charging is supplied to the wearing detection section 11 and the seat belt side communication section 12 through the control section 13. In addition, the charging section 15 is connected to the power storage section 14.

As shown in FIG. 5, a secondary coil 15a is provided in the charging section 15 provided in the tongue unit 10. The secondary coil 15a is provided in the tongue unit 10 such that the secondary coil 15a faces the belt support unit 71 when the seat belt 60 is in a housed state. The charging section 15 is connected to the power storage section 14, and is electrically coupled to the power supply section 31 provided in the vehicle side device 30 so that electric power from the power supply section 31 is supplied. The charging section 15 converts the supplied electric power into a state suitable for charging the power storage section 14, and charges the power storage section 14.

The first magnet 16 provided in the tongue unit 10 is disposed at a position close to the housing detection section 34 as housing position detection means that is provided in the vehicle side device 30 when the seat belt 60 is in a housed state.

The second magnet 21 provided in the buckle unit 20 is disposed at a position close to the wearing detection section 11 provided in the tongue unit 10 when the seat belt 60 is fastened, as shown in FIG. 4B.

A primary coil 31a is provided in the power supply section 31 provided in the vehicle side device 30. As shown in FIG. 6, the primary coil 31a of the power supply section 31 is disposed in the belt support unit 71 of the center pillar 70. As shown in FIGS. 6 and 7, when the seat belt 60 is in a housed state, the primary coil 31a of the power supply section 31 provided in the vehicle side device 30 is disposed at a position facing the secondary coil 15a of the charging section 15 provided in the tongue unit 10. The power supply section 31 is connected to the vehicle side control section 33, and the power supply section 31 is controlled to be in an operating state or a non-operating state based on the control of the vehicle side control section 33.

When the power supply section 31 is in the operating state, electric power is supplied to the charging section 15 by generating electromotive force in the secondary coil 15a of the charging section 15 provided in the tongue unit 10 by supplying AC current to the primary coil 31a. The power supply section 31 provided in the vehicle side device 30 and the power storage section 14 and the charging section 15 provided in the tongue unit 10 function as power supply means for supplying electric power to the wearing detection section 11, the seat belt side communication section 12, and the control section 13 provided in the tongue unit 10.

The vehicle side communication section 32 provided in the vehicle side device 30 has a communication function for performing radio communication with the seat belt side communication section 12. In addition, the vehicle side communication section 32 is connected to the control section 13, and the communication operation is controlled by the vehicle side control section 33. In addition, the vehicle side communication section 32 receives a radio signal transmitted from the seat belt side communication section 12, outputs the detection result of the wearing state of the seat belt 60 to the vehicle side control section 33, and transmits a transmission signal to the seat belt side communication section 12 based on a signal output from the vehicle side control section 33.

The vehicle side control section 33 provided in the vehicle side device 30 is connected to the power supply section 31, the vehicle side communication section 32, the housing detection section 34, and the notification unit 35. The vehicle side control section 33 controls the driving of the power supply section 31 in order to supply electric power to the charging section 15 when the housed state of the seat belt 60 is determined based on the detection result of the housing detection section 34 and the seat belt 60 is determined to be in a housed state. In addition, the vehicle side control section 33 controls the vehicle side communication section 32 to perform radio communication with the seat belt side communication section 12. The vehicle side control section 33 is connected to the vehicle battery 40, and detects the output voltage of the vehicle battery 40. In addition, the vehicle side control section 33 has a timer function or a memory (not shown), so that the vehicle side control section 33 can manage the control interval using the timer function or can store the acquired detection result of the housing detection section 34.

The housing detection section 34 provided in the vehicle side device 30 is formed by using a magnetic detection element, such as a magneto-resistive element or a Hall element, and detects the state of a magnetic field applied to the housing detection section 34 and outputs the detection result to the vehicle side control section 33. As shown in FIGS. 6 and 7, the housing detection section 34 is disposed in the belt support unit 71 of the center pillar 70. As shown in FIGS. 6 and 7, when the seat belt 60 is in a housed state, the housing detection section 34 provided in the vehicle side device 30 is disposed at a position facing the first magnet 16 provided in the tongue unit 10. Therefore, when the seat belt 60 is in a housed state and the tongue unit 10 is supported at a position facing the belt support unit 71, the first magnet 16 of the tongue unit 10 becomes closer to the housing detection section 34. As a result, it is possible to detect the housed state of the seat belt 60. Thus, the housing detection section 34 functions as housing position detection means.

The notification unit 35 provided in the vehicle side device 30 is connected to the vehicle side control section 33, and the notification unit 35 is controlled to perform an operation of notification to the user by voice or display based on the control of the vehicle side control section 33.

Figure 8:
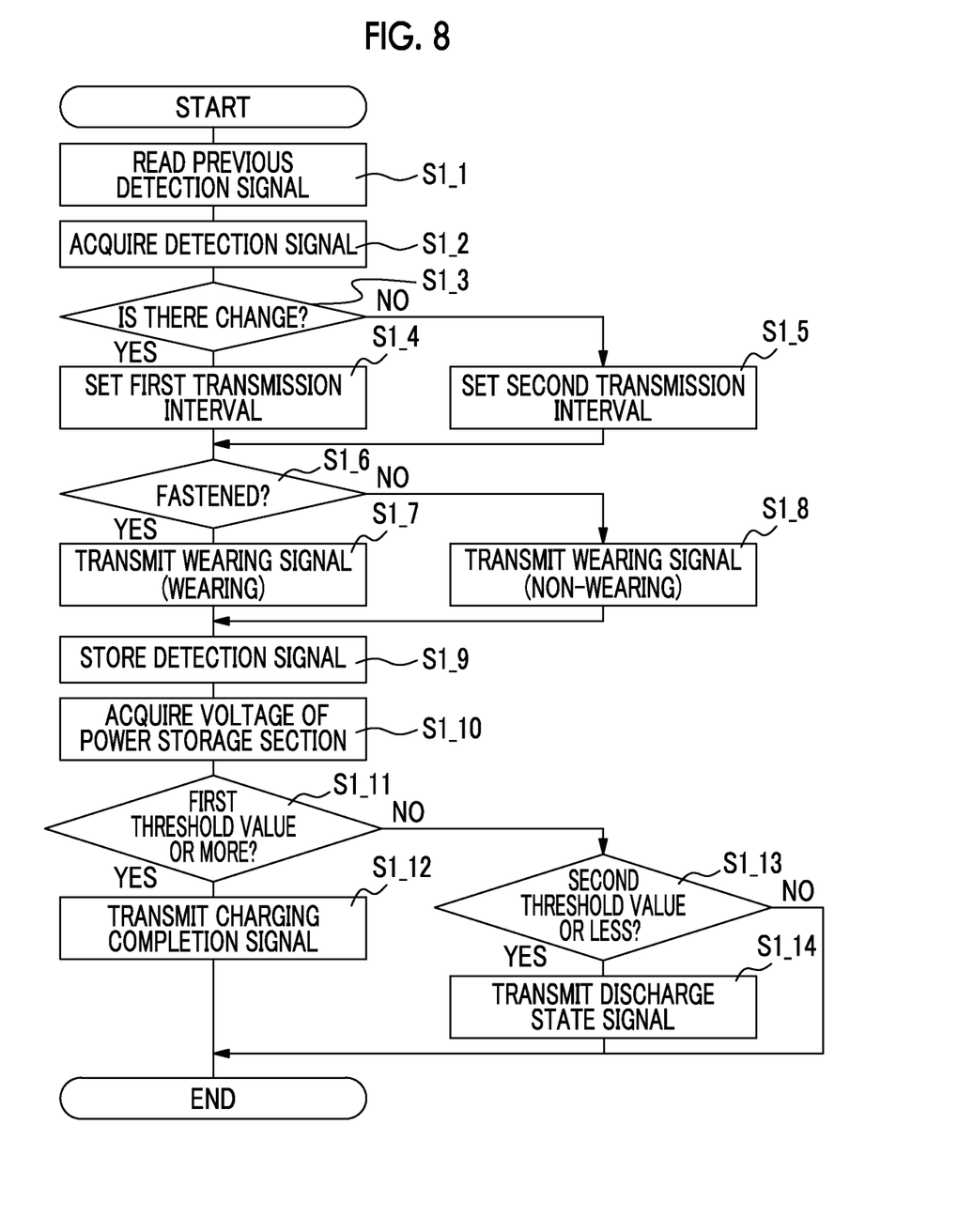
FIG. 8 is a flowchart showing the operation of the tongue unit of the seat belt wearing detection device according to the present embodiment.

Next, the operation of the tongue unit 10 of the seat belt wearing detection device 100 will be described with reference to FIG. 8. FIG. 8 is a flowchart showing the operation procedure of the tongue unit 10 of the seat belt wearing detection device 100. The procedure shown in the flowchart of FIG. 8 is performed periodically and repeatedly by the timer function that the control section 13 provided in the tongue unit 10 has. In addition, the following explanation will be given on the assumption that a storage region, in which an operating state or a detection signal acquired from the wearing detection section 11 is stored, is set in a memory included in the control section 13.

In step S1_1 shown in the flowchart of FIG. 8, the control section 13 reads a detection signal stored in the storage region of the memory included in the control section 13.

In step S1_2, the control section 13 controls the wearing detection section 11 to acquire a detection signal. Then, the process proceeds to step S1_3.

In step S1_3, the control section 13 compares the detection signal read in step S1_1 with the detection signal acquired in step S1_2, and proceeds to step S1_4 if there is a state change and to step S1_5 if the detection signals are the same.

In step S1_4, since it is determined that there is a state change in step S1_3, the control section 13 sets 200 msec as a short transmission interval as a first transmission interval, and proceeds to step S1_6.

In step S1_5, since it is determined that there is no state change in step S1_3, the control section 13 sets a 60 sec long transmission interval as a second transmission interval, and proceeds to step S1_6.

In step S1_6, the control section 13 determines the wearing state of the seat belt 60 from the detection signal acquired in step S1_2, and proceeds to step S1_7 when it is determined that the seat belt 60 is in a wearing state and to step S1_8 when it is determined that the seat belt 60 is in a non-wearing state.

In step S1_7, since it is determined that the seat belt 60 is in a wearing state in step S1_6, the control section 13 controls the seat belt side communication section 12, and transmits a wearing signal indicating the wearing of the seat belt 60 at intervals set in step S1_4 or step S1_5. The control section 13 proceeds to step S1_9 after ending the control of the seat belt side communication section 12.

In step S1_8, since it is determined that the seat belt 60 is in a non-wearing state in step S1_6, the control section 13 controls the seat belt side communication section 12, and transmits a wearing signal indicating the non-wearing of the seat belt 60 at intervals set in step S1_4 or step S1_5. The control section 13 proceeds to step S1_9 after ending the control of the seat belt side communication section 12.

In step S1_9, the control section 13 stores the detection signal acquired in step S1_2 in the storage region of the memory. Then, the process proceeds to step S1_10.

In step S1_10, the control section 13 acquires the value of the output voltage of the power storage section 14. Then, the process proceeds to step S1_11.

In step S1_11, the control section 13 compares a first threshold value for determining the completion of charging of the power storage section 14 with the value of the output voltage of the power storage section 14 acquired in step S1_10, and proceeds to step S1_12 if the value of the output voltage is equal to or greater than the first threshold value. When the resulting value of the output voltage is less than the first threshold value in the comparison, the process proceeds to step S1_13.

In step S1_12, since it is determined that the charging of the power storage section 14 has been completed in step S1_11, the control section 13 controls the seat belt side communication section 12, and transmits a charging completion signal indicating the completion of charging and ends the operation.

In step S1_13, the control section 13 compares the value of the output voltage of the power storage section 14 acquired in step S1_10 with a second threshold value, which is used to determine whether or not the value of the remaining capacity of the power storage section 14 is less than a predetermined value, and proceeds to step S1_14 if the value of the output voltage is equal to or less than the second threshold value. When the resulting value of the output voltage is greater than the second threshold value in the comparison, the operation is ended in step S1_13.

In step S1_14, since it is determined that the value of the remaining capacity of the power storage section 14 is less than the predetermined value in step S1_13, the control section 13 controls the seat belt side communication section 12, and transmits a discharge state signal indicating that the power storage section 14 is in a discharge state and ends the operation.

Figure 9:
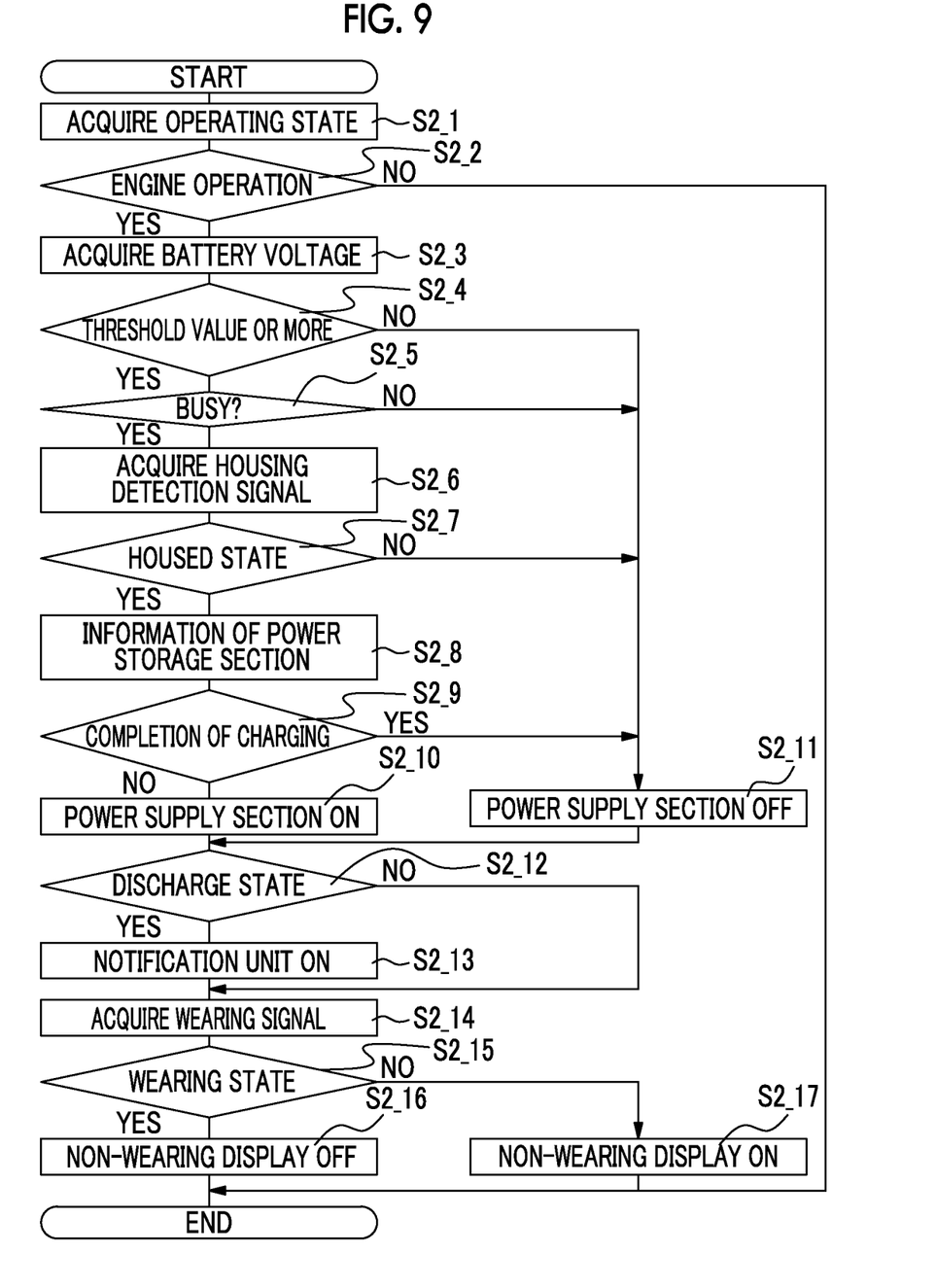
FIG. 9 is a flowchart showing the operation of a vehicle side device of the seat belt wearing detection device according to the present embodiment.

Next, the operation of the vehicle side device 30 of the seat belt wearing detection device 100 will be described with reference to FIG. 9. FIG. 9 is a flowchart showing the operation procedure of the vehicle side device 30 of the seat belt wearing detection device 100. The procedure shown in the flowchart of FIG. 9 is performed periodically and repeatedly by the timer function that the vehicle side control section 33 provided in the vehicle side device 30 has. In addition, the following explanation will be given on the assumption that a storage region, in which an operating state or a detection signal acquired from the housing detection section 34 is stored, is set in a memory included in the vehicle side control section 33.

In step S2_1 shown in the flowchart of FIG. 9, the vehicle side control section 33 acquires the information of the operating state of the vehicle from the control device 200 connected through the in-vehicle LAN 50. Then, the process proceeds to step S2_2.

In step S2_2, the vehicle side control section 33 determines the operating state of the engine based on the information of the operating state of the vehicle acquired in step S2_1, and proceeds to step S2_3 when the engine is operating and ends the operation when the engine has stopped.

In step S2_3, the vehicle side control section 33 acquires the value of the output voltage of the vehicle battery 40. Then, the process proceeds to step S2_4.

In step S2_4, the vehicle side control section 33 compares the value of the output voltage of the vehicle battery 40 acquired in step S2_3 with a threshold value, which is used to determine whether or not the remaining capacity of the vehicle battery 40 is less than a predetermined value, and proceeds to step S2_5 if the value of the output voltage is equal to or greater than the threshold value. When the resulting value of the output voltage of the vehicle battery 40 is less than the threshold value in the comparison, the process proceeds to step S2_11.

In step S2_5, the vehicle side control section 33 checks whether or not radio communication, such as keyless entry, is being performed based on the information of the operating state of the vehicle acquired in step S2_1, and proceeds to step S2_6 when there is no operation present that may affect other operations. When it is determined that there is an operation present that may affect other operations, the process proceeds to step S2_11.

In step S2_6, the vehicle side control section 33 controls the housing detection section 34 to acquire a detection signal. Then, the process proceeds to step S2_7.

In step S2_7, the vehicle side control section 33 determines the state of the seat belt 60 from the detection signal acquired in step S2_6, and proceeds to step S2_8 when it is determined that the seat belt 60 is in a housed state and to step S2_11 when it is determined that the seat belt 60 is not in a housed state.

In step S2_8, the vehicle side control section 33 acquires the information of the power storage section 14 transmitted from the seat belt side communication section 12 of the tongue unit 10 by radio communication. Then, the process proceeds to step S2_9.

In step S2_9, when the vehicle side control section 33 determines that the power storage section 14 is not in a charge completion state based on the information of the power storage section 14 acquired in step S2_8, the process proceeds to S2_10. When it is determined that the power storage section 14 is in a charge completion state in step S2_9, the process proceeds to step S2_11.

In step S2_10, the conditions that the engine of the vehicle is operating, the remaining capacity of the vehicle battery 40 is equal to or greater than a predetermined value, and an operation that may affect other operations, such as communication, is not performed and the power storage section 14 is not in a charging completion state are met. Therefore, the vehicle side control section 33 performs control to charge the power storage section 14 by driving the power supply section 31 to supply electric power to the charging section 15, and the process proceeds to step S2_12.

In step S2_11, one of the conditions that the remaining capacity of the vehicle battery 40 is equal to or less than the predetermined value, an operation that may affect other operations, such as communication, is performed, and the power storage section 14 is in a charging completion state is met. Therefore, the vehicle side control section 33 performs control preventing operation of the power supply section 31, and the process proceeds to step S2_12.

In step S2_12, the vehicle side control section 33 performs determination based on the information from the power storage section 14 acquired in step S2_8, and proceeds to step S2_13 when the power storage section 14 is in a discharge state and to step S2_14 when the power storage section 14 is not in a discharge state.

In step S2_13, since it has been determined that the power storage section 14 is in a discharge state in which the value of the remaining capacity of the power storage section 14 provided in the tongue unit 10 is less than the predetermined value in step S2_12, the vehicle side control section 33 performs control to drive the notification device 35. Then, the process proceeds to step S2_14. Since the notification device 35 performs a notification operation, the user can recognize that the power storage section 14 of the tongue unit 10 is in a discharge state. Therefore, it is possible to take appropriate action, such as performing charging or checking the degradation of the power storage section 14.

In step 52_14, the vehicle side control section 33 acquires the wearing signal of the seat belt 60 transmitted from the seat belt side communication section 12 of the tongue unit 10 by radio communication. Then, the process proceeds to step S2_15.

In step S2_15, the vehicle side control section 33 proceeds to step S2_16 when the wearing signal acquired in step S2_14 indicates wearing and to step S2_17 when the wearing signal acquired in step S2_14 indicates non-wearing.

In step S2_16, since it has been determined that the seat belt 60 is fastened in step S2_15, the vehicle side control section 33 outputs a control signal, which is for turning off the display to warn of the non-wearing state of the seat belt 60, to the control device 200 connected through the in-vehicle LAN 50, and ends the operation.

In step S2_17, since it has been determined that the seat belt 60 is not fastened in step S2_15, the vehicle side control section 33 outputs a control signal, which is for turning on the display to warn of the non-wearing state of the seat belt 60, to the control device 200 connected through the in-vehicle LAN 50, and ends the operation.

As described above, the seat belt wearing detection device 100 operates as a seat belt wearing detection device that turns on or off the display to warn of the non-wearing state based on the signal indicating the wearing state of the seat belt 60 that has been acquired by radio communication.

Hereinafter, the effect of the present embodiment will be described.

The seat belt wearing detection device 100 according to the present embodiment includes: the tongue unit 10 supported by the seat belt 60, the buckle unit 20 which is provided in the seat 80 and into which the tongue unit 10 is inserted and held to fasten the seat belt 60; and the vehicle side device 30. The tongue unit 10 includes the wearing detection section 11, the seat belt side communication section 12, and the control section 13. The power supply section 31, the power storage section 14, and the charging section 15 form power supply means. The power supply section 31 charges the power storage section 14 by supplying electric power to the charging section 15 when the seat belt 60 is in a housed state.

In this case, since the power storage section 14 is charged by the charging section 15 when the seat belt 60 is in a housed state, the power storage section 14 is always charged when the user is not using the seat belt 60. Therefore, it is possible to supply electric power required for communication. For this reason, when a transmitted signal cannot be received correctly due to the influence of electromagnetic noise or the like, it is possible to perform retransmission or to transmit the state periodically. Therefore, it is possible to provide a seat belt wearing detection device capable of ensuring reliability by transmitting the wearing detection signal continuously.

In addition, the seat belt wearing detection device 100 according to the present embodiment may further include the belt support unit 71 that supports attachment and detachment of the seat belt 60. The power supply section 31 may be disposed in the belt support unit 71, and the charging section 15 and the power storage section 14 may be provided in the tongue unit 10. The belt support unit 71 and the tongue unit 10 may be disposed at positions facing each other when the seat belt 60 is in a housed state.

In this case, since the power supply section 31 is disposed in the belt support unit 71, the supply of electric power to the power supply section 31 is made possible by a simple structure connected to the fixed wiring line of the vehicle. In addition, since the belt support unit 71 and the tongue unit 10 are disposed at positions facing each other when the seat belt 60 is in a housed state, the power supply section 31 and the charging section 15 can be easily connected to each other. Therefore, it is possible to easily charge the power storage section 14 in the housed state.

In the seat belt wearing detection device 100 according to the present embodiment, the seat belt side communication section 12 may be provided in the tongue unit 10.

In this case, the power storage section 14 and the seat belt side communication section 12 can be easily connected to each other in the tongue unit 10. Therefore, the supply of electric power to the seat belt side communication section 12 can be easily performed.

In the seat belt wearing detection device 100 according to the present embodiment, the vehicle side device 30 may include the housing detection section 34 as housing position detection means. Based on a detection result of the housing position detection means, the vehicle side device 30 may perform control to drive the power supply section 31 when it is detected that the tongue unit 10 is in the housed state.

In this case, since the power supply section 31 is driven only when it is detected that the tongue unit 10 is in the housed state, the power storage section 14 can be efficiently charged without wasting electric power.

In addition, in the seat belt wearing detection device 100 according to the present embodiment, the primary coil 31a may be provided in the power supply section 31, and the secondary coil 15a may be provided in the charging section 15. Electromotive force may be generated in the secondary coil 15a by supplying AC current to the primary coil 31a.

In this case, since the primary coil 31a and the secondary coil 15a are inductively coupled, electric power can be supplied from the power supply section 31 to the charging section 15. Therefore, since the power supply section 31 provided in the belt support unit 71 and the charging section 15 provided in the tongue unit 10 are close to each other when the seat belt 60 is in a housed state, it is possible to reliably perform charging.

In addition, in the seat belt wearing detection device 100 according to the present embodiment, when the seat belt 60 is in a housed state, the primary coil 31a of the power supply section 31 and the secondary coil 15a of the charging section 15 may be disposed at positions facing each other.

In this case, when the seat belt 60 is in a housed state, the power supply section 31 including the primary coil 31a and the charging section 15 including the secondary coil 15a are disposed at positions facing each other, and electric power can be reliably supplied from the power supply section 31 to the charging section 15 without the user being aware of it.

In addition, in the seat belt wearing detection device 100 according to the present embodiment, the vehicle side device 30 may be connected to the vehicle battery 40, and the vehicle side device 30 may perform control preventing operation of the power supply section 31 when the remaining capacity of the vehicle battery 40 is less than the predetermined value.

In this case, the consumption of the vehicle battery 40 power can be prevented by supplying electric power according to the state of the vehicle battery 40.

In addition, in the seat belt wearing detection device 100 according to the present embodiment, the vehicle side device 30 may include the notification unit 35, acquire a value of the remaining capacity of the power storage section 14 from the seat belt side communication unit 12 by radio communication, and drive the notification unit 35 when the acquired value of the remaining capacity of the power storage section 14 is less than a predetermined value.

In this case, since the notification unit 35 is driven when the value of the remaining capacity of the power storage section 14 is small, it is possible to notify the user of a situation where the power storage section is not charged for a long period of time or the power storage section 14 has deteriorated and accordingly the capacity has been reduced. Therefore, it is possible to appropriately maintain the charge state of the power storage section 14 or to perform proper maintenance, such as replacing the power storage section 14.

While the seat belt wearing detection device 100 according to the embodiment of the present invention has been specifically described above, the invention is not limited to the embodiment described above, and various changes may be made without departing from the scope of the present invention. For example, the following modifications can be implemented, and these embodiments also belong to the technical range of the present invention.

(1) In the present embodiment, the example has been described in which the belt support unit 71 is provided in the center pillar 70 of the vehicle. However, the belt support unit 71 may be provided in the seat 80. In this case, the same effect can be obtained if the power supply section 31 is provided on the vehicle side facing a position where the tongue unit 10 is supported when the seat belt 60 is in a housed state.

(2) In the present embodiment, the example has been described in which the notification unit 35 is provided in the vehicle side device 30. However, the notification unit 35 may be provided separately from the vehicle side device 30. In this case, a placing unit may be connected to the in-vehicle LAN 50, and the notification unit 35 may be connected to the vehicle side device through the in-vehicle LAN 50.

(3) In the present embodiment, the example has been described in which the seat belt side communication section 12 and the charging section 15 are separately provided and the power supply section 31 and the vehicle side communication section 32 are separately provided. However, the seat belt side communication section 12 and the charging section 15 may be integrally provided, and the power supply section 31 and the vehicle side communication section 32 may be integrally provided. Specifically, it is possible to perform communication in a close state by switching the current supplied to the primary coil 31a and the load state of the secondary coil 31a between the primary coil 31a provided in the power supply section 31 and the secondary coil 15a provided in the charging section 15. In this case, the power supply section 31 checks periodically whether or not communication with the charging section 15 is possible, thereby being able to determine whether or not the tongue unit 10 is in a housed state in which the tongue unit 10 is supported by the belt support unit 71. Therefore, since the housing detection section 34 and the first magnet 16 can be omitted, it is possible to configure the seat belt wearing detection device with a small number of components. As a result, it is possible to reduce the cost or to simplify the assembly process.

It should be understood by those skilled in the art that various modifications, combinations, sub-combinations and alterations may occur depending on design requirements and other factors insofar as they are within the scope of the appended claims of the equivalents thereof.

What is claimed is:

1. A seat belt wearing detection device, comprising:
   a tongue unit supported by a seat belt having a housed state and a pulled-out state;
   a buckle unit provided to a seat, the seat belt being fastened by inserting and holding the tongue unit in the buckle unit;
   a wearing detection unit that detects an insertion and holding state of the tongue unit in the buckle unit;
   a seat belt side communication unit that transmits a detection result of the wearing detection unit via a radio signal;
   a control unit connected to the seat belt side communication unit and the wearing detection unit, the control unit determining a wearing state of the seat belt based on the detection result, and controlling the seat belt side communication unit;
   a vehicle side device that receives the radio signal from the seat belt side communication unit to obtain the detection result, the vehicle side device including:
      a housed position detection unit configured to detect if the tongue unit is in a housed position; and
      a power supply system that supplies electric power to the seat belt side communication unit, the power supply system including:
         a power storage section that is chargeable and dischargeable;
         a charging section that charges the power storage section; and
         a power supply section that supplies electric power to the charging section so as to charge the power storage section when the seat belt is in the housed state,
      wherein the vehicle side device drives the power supply section if a detection result of the housing position detection unit indicates that the tongue unit is in the housed position.

2. The seat belt wearing detection device according to claim 1, further comprising:
   a belt support unit that movably supports the seat belt so as to allow the seat belt to be pulled out and retract, the tongue unit being in a housed position thereof facing the belt support unit when the seat belt is in the housed state,
   wherein the power supply section is disposed in the belt support unit, and the charging section and the power storage section are provided in the tongue unit.

3. The seat belt wearing detection device according to claim 1,
   wherein the seat belt side communication unit is provided in the tongue unit.

4. The seat belt wearing detection device according to claim 1, wherein the power supply section includes a primary coil, and the charging section includes a secondary coil, such that an electromotive force is generated in the secondary coil by supplying an AC current to the primary coil.

5. The seat belt wearing detection device according to claim 4,
   wherein the primary coil of the power supply section and the secondary coil of the charging section face each other when the seat belt is in the housed state.

6. The seat belt wearing detection device according to claim 1,
   wherein the vehicle side device is connected to a vehicle battery,
   and wherein the vehicle side device prevents the power supply section from operating when a battery level of the vehicle battery is lower than a predetermined value.

7. The seat belt wearing detection device according to claim 1,
   wherein the vehicle side device includes a notification unit,
   and wherein the vehicle side device acquires a battery level value of the power storage section from the seat belt side communication unit by radio communication, and drives the notification unit if the acquired battery level of the power storage section is lower than a predetermined value.

8. The seat belt wearing detection device according to claim 1, wherein the tongue unit in the housed position faces a belt support unit that movably supports the seat belt so as to allow the seat belt to be pulled out and retract.

* * * * *